(12) United States Patent
Sweeney et al.

(10) Patent No.: US 12,312,507 B2
(45) Date of Patent: May 27, 2025

(54) RADIO FREQUENCY HEATING FOR RAPID CURING OF NANOCOMPOSITE ADHESIVES

(71) Applicant: The Texas A&M University System, College Station, TX (US)

(72) Inventors: Charles Brandon Sweeney, College Station, TX (US); Micah J. Green, College Station, TX (US)

(73) Assignee: The Texas A&M University System, College Station, TX (US)

( * ) Notice: Subject to any disclaimer, the term of this patent is extended or adjusted under 35 U.S.C. 154(b) by 1243 days.

(21) Appl. No.: 16/765,424

(22) PCT Filed: Nov. 21, 2018

(86) PCT No.: PCT/US2018/062313
§ 371 (c)(1),
(2) Date: May 19, 2020

(87) PCT Pub. No.: WO2019/104216
PCT Pub. Date: May 31, 2019

(65) Prior Publication Data
US 2020/0317957 A1 Oct. 8, 2020

Related U.S. Application Data

(60) Provisional application No. 62/589,298, filed on Nov. 21, 2017.

(51) Int. Cl.
*C09J 5/06* (2006.01)
*B29C 35/08* (2006.01)
(Continued)

(52) U.S. Cl.
CPC .............. *C09J 5/06* (2013.01); *B29C 35/0805* (2013.01); *C09J 11/04* (2013.01); *F16B 5/08* (2013.01);
(Continued)

(58) Field of Classification Search
CPC ........ C09J 5/06; C09J 11/04; C09J 2301/416; C09J 2463/00; C09J 2475/00;
(Continued)

(56) References Cited

U.S. PATENT DOCUMENTS

| 5,277,737 | A | 1/1994 | Li et al. |
| 2004/0159654 | A1* | 8/2004 | Ryan .................. B29C 66/7234 |
| | | | 219/634 |

(Continued)

FOREIGN PATENT DOCUMENTS

| CN | 1301289 A | 6/2001 |
| EP | 0492789 A1 | 7/1992 |

(Continued)

*Primary Examiner* — Daniel H Lee
(74) *Attorney, Agent, or Firm* — Winstead PC

(57) ABSTRACT

A non-contact method of joining two components via direct heating of a thermoset adhesive includes applying the thermoset adhesive to at least a first component of the two components. The thermoset adhesive includes a susceptor to reacts in the presence of an electromagnetic field. The method includes placing the first component and a second component of the two components in proximity to an electromagnetic field. In some aspects, the method includes placing the first and second components in proximity to an electromagnetic field of a capacitor. The susceptor interacts with the electromagnetic field to heat the thermoset adhesive via resistive heating. In some aspects, a method of direct-contact heating of the thermoset adhesive includes attaching electrodes to a film comprising the adhesive. The components being joined together are not directly heated by the electromagnetic field, and as a result experience much lower temperatures than the thermoset adhesive.

13 Claims, 14 Drawing Sheets

(51) Int. Cl.
*C09J 11/04* (2006.01)
*F16B 5/08* (2006.01)
B29C 65/00 (2006.01)
B29C 65/48 (2006.01)
B29K 63/00 (2006.01)
B29K 75/00 (2006.01)
B29K 105/00 (2006.01)
B29K 105/16 (2006.01)
B29K 301/10 (2006.01)
B29K 307/04 (2006.01)
B29K 507/04 (2006.01)
B29K 509/00 (2006.01)
C08K 3/04 (2006.01)

(52) U.S. Cl.
CPC ... *B29C 2035/0811* (2013.01); *B29C 65/4835* (2013.01); *B29C 66/91651* (2013.01); *B29K 2063/00* (2013.01); *B29K 2075/00* (2013.01); *B29K 2105/002* (2013.01); *B29K 2105/0088* (2013.01); *B29K 2105/162* (2013.01); *B29K 2301/10* (2013.01); *B29K 2307/04* (2013.01); *B29K 2507/04* (2013.01); *B29K 2509/00* (2013.01); *C08K 3/041* (2017.05); *C08K 3/042* (2017.05); *C09J 2301/416* (2020.08); *C09J 2463/00* (2013.01); *C09J 2475/00* (2013.01)

(58) Field of Classification Search
CPC ............. C09J 2203/35; C09J 2203/354; B29C 35/0805; B29C 65/4835; B29C 66/91651; B29C 2035/0811; B29C 65/48; B29C 65/36; F16B 5/08; F16B 11/006; B29K 2063/00; B29K 2075/00; B29K 2105/002; B29K 2105/0088; B29K 2105/162; B29K 2301/10; B29K 2307/04; B29K 2507/04; B29K 2509/00; C08K 3/041; C08K 3/042; C08K 3/04; C08K 2201/001; H05B 6/105
See application file for complete search history.

(56) References Cited

U.S. PATENT DOCUMENTS

| | | |
|---|---|---|
| 2005/0200359 A1 | 9/2005 | Withers |
| 2011/0013954 A1 | 1/2011 | Domoto et al. |
| 2016/0023433 A1* | 1/2016 | Langone ................ B32B 27/40 |
| | | 428/323 |
| 2016/0284449 A1 | 9/2016 | Haq et al. |

FOREIGN PATENT DOCUMENTS

| | | |
|---|---|---|
| JP | H04277581 A | 10/1992 |
| JP | 2003510402 A | 3/2003 |
| JP | 2010-6908 A | 1/2010 |
| JP | 2013-510402 A | 3/2013 |
| JP | 2017-30311 A | 2/2017 |

* cited by examiner

RADIO FREQUENCY HEATING FOR RAPID CURING OF NANOCOMPOSITE ADHESIVES

CROSS-REFERENCES TO RELATED APPLICATIONS

This application claims the benefit of priority to and incorporates by reference the entire disclosure of U.S. Provisional Patent Application No. 62/589,298 filed on Nov. 21, 2017.

STATEMENT REGARDING FEDERALLY SPONSORED RESEARCH OR DEVELOPMENT

This invention was made with government support under Grant No. CMMI-1561988 awarded by the National Science Foundation. The government has certain rights in the invention.

BACKGROUND

This section provides background information to facilitate a better understanding of the various aspects of the disclosure. It should be understood that the statements in this section of this document are to be read in this light, and not as admissions of prior art.

Joule heating of nanocomposite materials has resulted in many unique applications for material processing, including embedded curing of composites, embedded heating elements for deicing applications, and localized welding of 3D printed parts. Most work to date has focused on direct current (DC) heating or microwave heating of electrically conductive nanocomposite materials. Manufacturing industries are in need of an adhesive-based equivalent of spot-welding where parts are joined nearly instantaneously.

Methods have been used for curing thermoset polymers loaded with conductive nanomaterials by using microwave energy as an electromagnetic source. However, prior methods have failed to join together two conductive parts because the conductive parts reflect away the microwave energy used to heat the thermoset adhesive.

SUMMARY

In exemplary embodiments, systems and methods of using radio frequency (RF) electromagnetic heating of polymer nanocomposite materials via direct-contact and capacitively coupled electric field applicators are disclosed. RF heating allows susceptors (e.g., nanocomposite materials) within the adhesive to be resistively heated with electric fields, eliminating the need for heat sources such as ovens and heat guns. Using the RF heating technique, parts can be joined together by heating the adhesive itself in place. Importantly, the RF heating technique directly heats the adhesive and not the components being joined together as the heat is generated within the adhesive itself via resistive heating of the susceptors. Heating the adhesive directly and not directly heating the components being joined is important because it eliminates or reduces distortion, warping, and/or coefficient of thermal expansion mismatch in the components that are being joined.

The exemplary methods are particularly useful in the automotive and aerospace industries where rapid bonding of structural components with a thermoset adhesive is desired. For example, the RF heating technique of the instant application can be used to cure an automotive-grade epoxy loaded with multi-wall carbon nanotubes (MWCNTs). By targeting the adhesive component as the heating element, heat transfer limitations are avoided as is costly custom tooling normally required to heat the adhesive to its reaction temperature. Lap shear joints cured with the instant RF method cured faster compared with control samples cured in an oven due to the heat-transfer advantages of directly heating the epoxy composite.

Prior methods have failed to join together two conductive parts because the conductive parts reflect away the microwave energy used to heat the thermoset adhesive. The instant methods overcome this problem by using the structural components that are being joined together as electrodes to apply RF energy to a composite adhesive.

An example RF heating method includes formulating nanocomposite-loaded adhesives that are susceptible to electromagnetic energy and applying the adhesives to parts to be joined. In some embodiments, a clamping system can be used to hold together two parts to be joined by the adhesive. The clamping pressure should be sufficient to ensure that no voids form. An RF applicator can be used to provide the required field to the adhesive layer. Output of the radio frequency amplifier is tuned for efficient coupling of the RF to the adhesive. Tuning may be done by frequency tuning, a matching network, or a hybrid of these two approaches.

The exemplary method can be applied in one of two ways. The first method is a direct contact method in which the adhesive may be used to join two electrically conductive parts together. Electrodes are applied to each of the two parts to be joined, with one electrode being grounded and the other electrode being connected to the "hot" radio frequency amplifier output. An RF signal is applied across the electrodes to generate an electromagnetic field, which heats the adhesive via resistive heating. Using this method, the parts being joined are not directly heated. The system can be tuned for efficient coupling of the RF to the adhesive, this may be done with either frequency tuning, a matching network, or a hybrid of the two.

A second method is a non-contact method in which an RF applicator uses a capacitor to apply a field in the vicinity of the adhesive. For example, a parallel plate capacitor can be used where the sample is placed either between the parallel plates or near the field of the parallel plates (where one plate is grounded and the other connected to the RF amplifier output). This may also take place in a "fringing field" capacitor. In fringing field examples, parallel metal plates, traces, or lines are set up as a capacitor (with fairly low spacing on the order of millimeters), and the sample is placed in the fringing field just above the electrodes. The proximity of the sample is typically on the order of millimeters. The electromagnetic field produced by the RF applicator heats the adhesive via resistive heating.

In an illustrative embodiment, a method of joining two components via direct heating of a thermoset adhesive includes: applying the thermoset adhesive to at least a first component of the two components, the thermoset adhesive comprising a susceptor; contacting the first component with a first electrode and contacting a second component of the two components with a second electrode; contacting the second component with the thermoset adhesive; creating an electromagnetic field by applying an RF signal across the first and second electrodes; and wherein the susceptor interacts with the electromagnetic field to heat the thermoset adhesive via resistive heating.

In an illustrative embodiment, a non-contact method of joining two components via direct heating of a thermoset adhesive includes: applying the thermoset adhesive to at least a first component of the two components, the thermoset adhesive comprising a susceptor; placing the first component and a second component of the two components between plates of a parallel plate capacitor; creating an electromagnetic field between the plates of the parallel plate capacitor by applying an RF signal across the plates of the parallel plate capacitor; and wherein the susceptor interacts with the electromagnetic field to heat the thermoset adhesive via resistive heating.

In an illustrative embodiment, a non-contact method of joining two components via direct heating of a thermoset adhesive includes: applying the thermoset adhesive to a first component of the two components, the thermoset adhesive comprising a susceptor; contacting a second component of the two components with the thermoset adhesive; passing an interdigitated capacitor over the first and second components while applying an RF signal to the interdigitated capacitor to create an electromagnetic field around the interdigitated capacitor; and wherein the susceptor interacts with the electromagnetic field to heat the thermoset adhesive via resistive heating.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

Figure 1A:
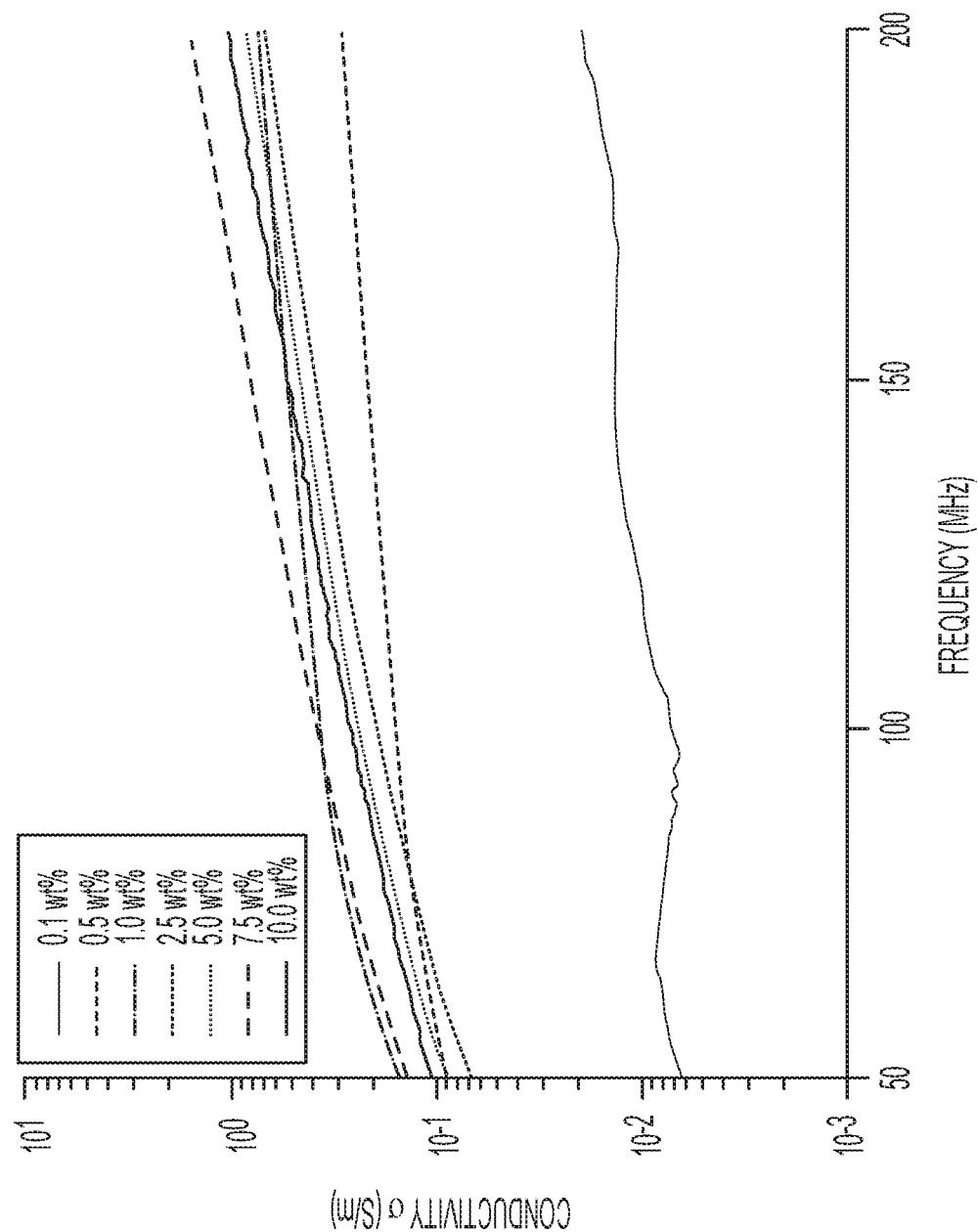
FIG. 1A is a graph of conductivity versus frequency of hot pressed films for different CNT wt % s.
Figure 1B:
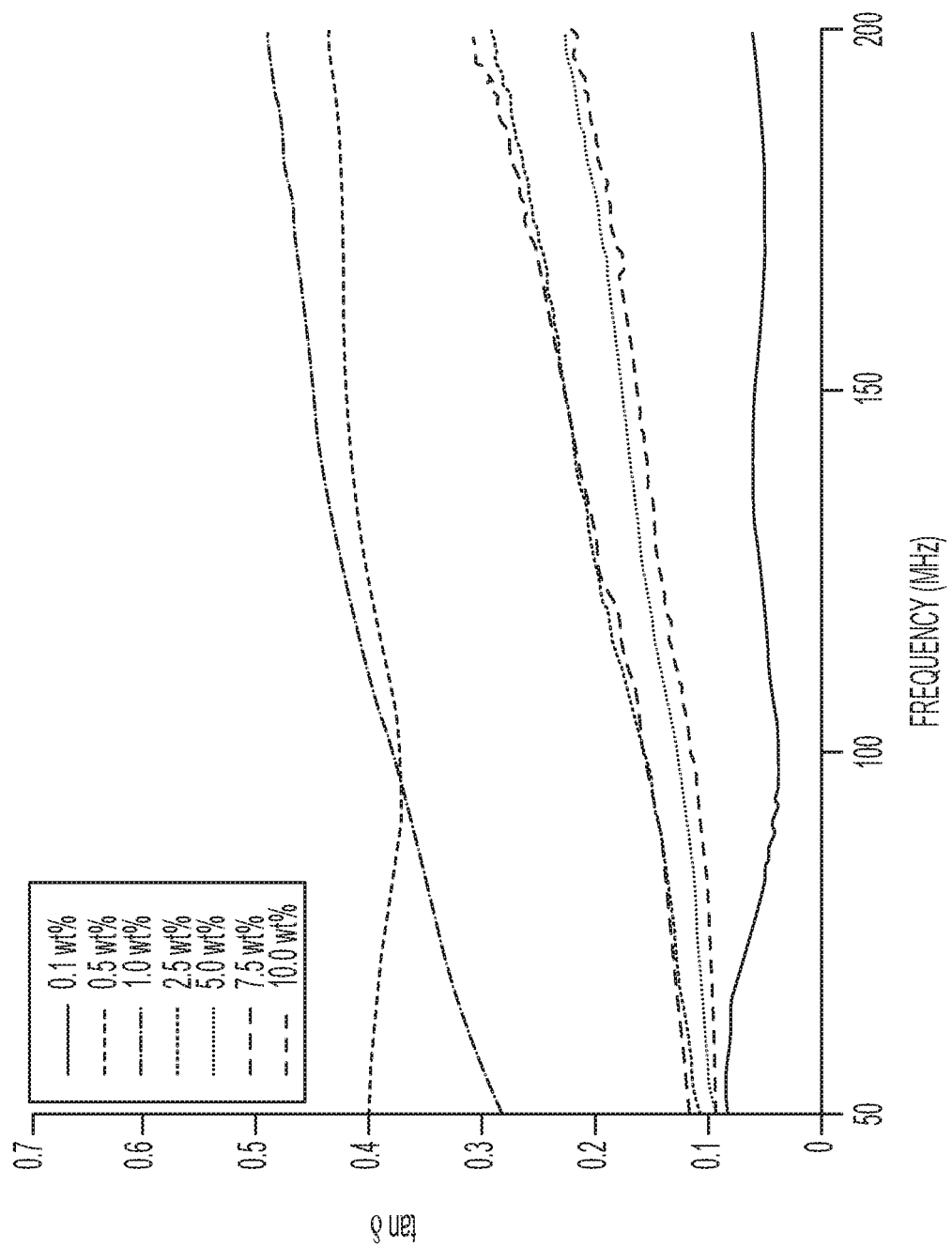
FIG. 1B is a graph of a loss tangent of the conductivity of FIG. 1A.

DESCRIPTION OF EXEMPLARY
EMBODIMENTS OF THE INVENTION

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Radio frequency (RF) heating of polymer nanocomposite materials is an interesting and largely unexplored method for heating nanocomposite materials. RF heating as discussed herein includes heating using radio frequencies of from approximately 3 kHz to approximately 300 MHz. To date, literature has focused on RF heating of nanocomposites for hyperthermia applications or inductively coupled RF heating of nanocomposites. Induction heating is only efficient for materials with magnetic hysteresis losses or materials with extraordinarily high magnetic fields for conductive composites. In the case of carbon nanotube (CNT)-loaded composites, induction heating is highly inefficient, and only works at short ranges when the material is placed inside the solenoid or just outside it. In contrast, RF heating with electric fields can operate over much larger distances and directly couples to the composite material.

The benefits of RF heating include the flexibility to directly or remotely couple electromagnetic energy to a nanocomposite material, more efficiently transfer energy to the material due to capacitive coupling, the option to use subpercolation loading levels of nanoparticle fillers, reduce safety concerns by decreasing stray electromagnetic radiation, and apply direct heating to the adhesive and not the parts being joined together.

A notable example of RF heating is the DC resistive heating of a carbon nanotube film for de-icing coatings. There are however two major draw-backs associated with DC Joule heating. First, the resistive material needs to be directly connected to the circuit with conductive electrodes. Second, the material needs to have a relatively high conductivity to pass a current through the material. Alternating electric fields may also be used to excite currents in conductive composite materials for heating applications. Microwave heating of nanocomposite materials utilizes electromagnetic energy between 300 MHz and 300 GHz to heat lossy dielectrics and has the benefits of being able to remotely heat the target material with high energy density. Even so, heating parts uniformly with microwaves is difficult, and shielding requirements present challenges for practical applications to prevent the dangerous emission of microwave energy.

The instant RF heating method works with direct-contact, parallel plate, and fringing field applicator geometries, each of which is capable of heating nanotube composites at high heating rates. For example, curing a high strength epoxy loaded with CNTs in a lap shear joint configuration is shown. In this case, the aluminum lap shear coupons serve as the direct-contact electrodes used to apply the RF energy to the epoxy nanocomposite. Because of the volumetric heating capability of the RF method, the RF-cured lap shear samples reached green strength in three minutes as opposed to five minutes for a conventional oven curing method.

The instant RF heating technique may be used with various combinations of thermosets and susceptors that react in the presence of an electromagnetic field. Examples of thermosets include epoxies and urethanes. Examples of susceptors include carbon nanomaterials with extensive sp2 hybridization and electrical conductivity. This would include carbon nanotubes (both single-walled and multi-walled), graphene family nanosheets, and carbon black particles. Also, inorganic nanomaterials such as $Ti_3C_2T_x$ nanosheets will also work. The susceptors are used in combination with thermoplastic composites such as PLA, PEEK, Nylon, Polycarbonate, Polypropylene, and polyethylene.

WORKING EXAMPLES

Sample Preparation

Carbon nanotube polylactide (PLA) composite films were prepared via melt compounding. Starting with a 10.0 wt % MWCNT/PLA master batch (Nanocyl SA, custom batch), various dilutions were melt compounded into neat PLA (NatureWorks LLC, 3D850) with a micro-conical twin screw compounder (Thermo Fisher Scientific Inc., HAAKE™ MiniCTW). Prior to compounding, the polymer samples were thoroughly dried per the manufacturer's specifications. Samples were melt compounded for approximately four minutes at 215° C. before the die was opened and the sample allowed to extrude. The nanocomposite dilutions were then hot-pressed (Carver Inc., model 3856) into uniform 0.5 mm thick films at 150° C. and 27.6 MPa. Rectangular samples 3×5 cm were cut from the films and silver electrodes were painted onto the edges to aid in contact to the RF applicator cables.

Impedance Spectrometry

The complex permittivity was measured using a capacitive sample holder that included two conducting cylindrical disks and a network analyzer. An adapter was used to convert N-type coaxial connection from the network analyzer to two parallel prongs to connect to the capacitor disks. In the measurement, the sample under test was placed between the two disks and the scattering parameter S11 was acquired for the desired frequency range. A calibration procedure was used to account for the connecting cables, the adapter, and capacitor parasitics. The capacitor impedance was obtained from the measured S11 parameter, which was then used to compute the complex permittivity, taking into account the fringing fields.

Thermographic Spectroscopy

Figure 1C:
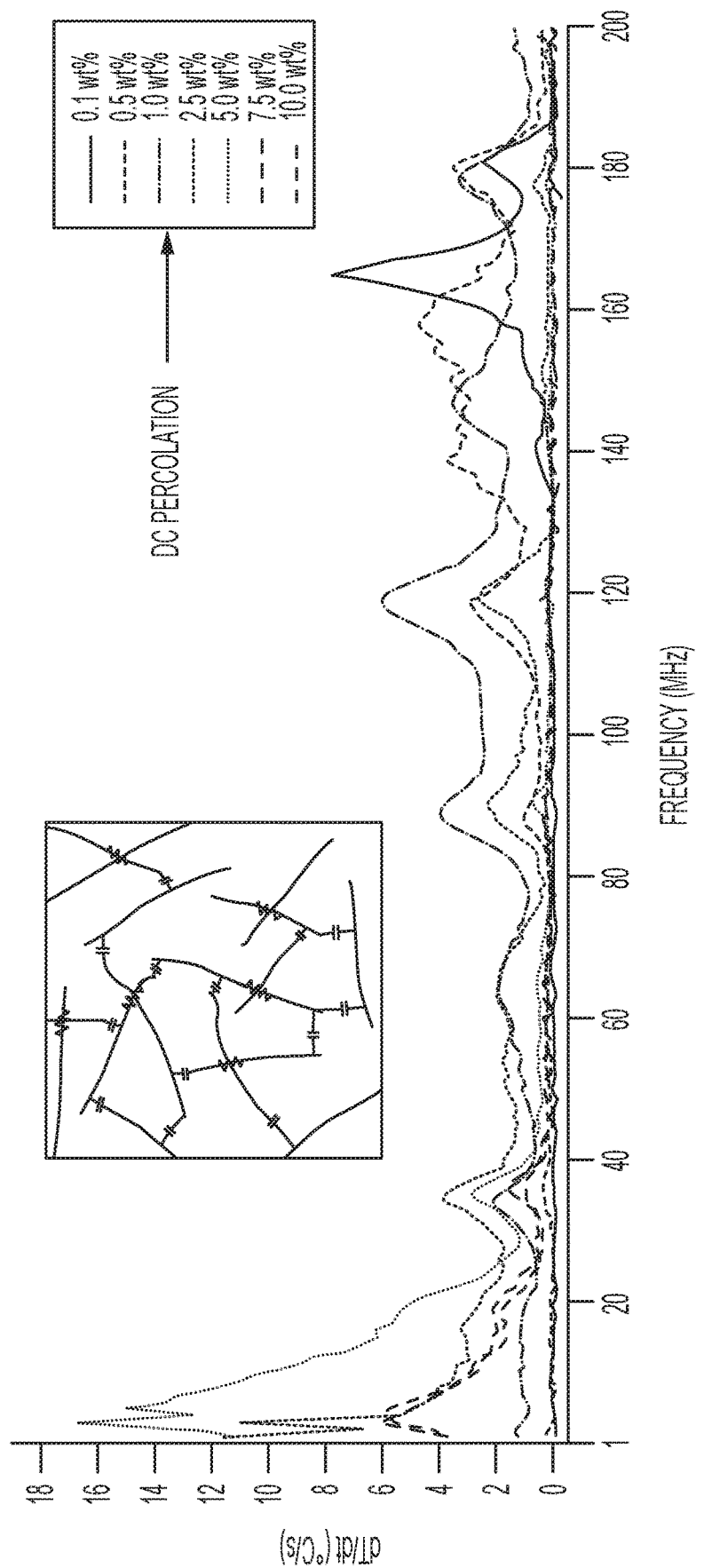
FIG. 1C is a graph of heating rate versus frequency for MWCNT/PLA composites for different CNT wt % s.
Figure 1D:
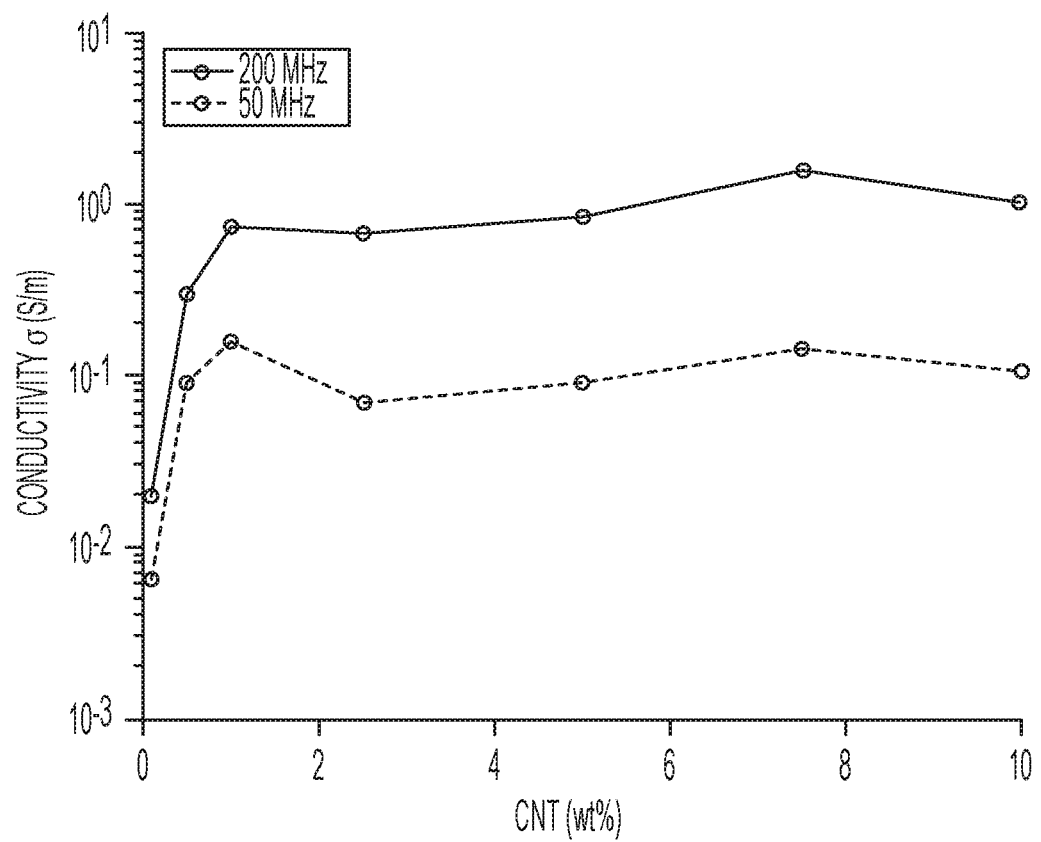
FIG. 1D is a graph of AC Conductivity versus weight fraction of CNTs in PLA hot pressed films at 50 MHz and 200 MHz.

Radio frequency (RF) power was applied to the samples with a signal generator (Rigol Inc., DSG815) and 500 W amplifier (Prana R&D, GN500D). The samples were connected to the amplifier with a 50 W coaxial transmission line terminated by a Type N bulkhead connector with alligator clips soldered to the center pin and ground reference. Samples were placed in a custom laminar airflow box to have a consistent advective cooling rate across all samples. The samples were directly monitored with a forward-looking infrared camera system (FLIR Systems Inc., A655sc). To test the frequency dependent heating response of the samples and the RF power equipment, a stepwise heat-cool frequency sweep was programmed into the signal generator. Frequencies from 1-200 MHz were swept such that power at 40 dBm (10 W) is applied for 2 seconds, followed by 13 seconds of cooling before moving to the next 1 MHz incremental step. The heating rates as a function of frequency were determined by selecting the points when the power is switched on and 1 second into each cycle and calculating the slope between the points as shown in FIG. 1C.

Lap Shear RF Bonding

Example 1

Aluminum strips (ThyssenKrupp Materials NA Inc., 7075 T6) 1 mm thick and 25.4 mm wide by 152.4 mm long were bonded using a single-part high temperature cure epoxy (Betamate, DowDuPont Inc.). The epoxy and CNT's (0.25 wt %) were mixed with a planetary centrifugal mixer (AR-100, THINKY USA, Inc.) at 2000 rpm for 15 minutes. Lap shear samples were prepared and tested for lap shear strength according to ASTM D1002. PEI spacers were inserted on both edges of the lap shear samples to ensure that a consistent bond line thickness was maintained for every sample. A strip of Kapton polyimide tape was used to clamp the strips in position during the curing procedure. Control samples were cured in an oven according to the manufactures recommended processing conditions. The samples were suspended across thermally insulating alumina bricks to ensure convention heating dominated rather than thermal conduction through the aluminum strips. The oven was preheated to 200° C. and samples were timed according to the total residence time in the oven, ranging from two to six minutes. For the RF-cured samples, the prepared specimens were connected to the RF amplifier by grounding one of the aluminum strips and connecting the other to the center pin of the type N bulkhead connector. The applied power was approximately 10-100 W at 44 MHz throughout the curing process and was manually controlled by directly observing the temperature of the samples with an FLIR camera. The "green strength" of the joint was assessed by curing the specimen at a specified time at 200° C., followed by immediately weighting the lap shear specimen with 8.2 kg. Samples that could hold the weight without measureable joint displacement were defined as having reached their green strength, conversely, if the lap shear joint failed, the specimen was defined as failing the green strength.

Example 2

Figure 5:
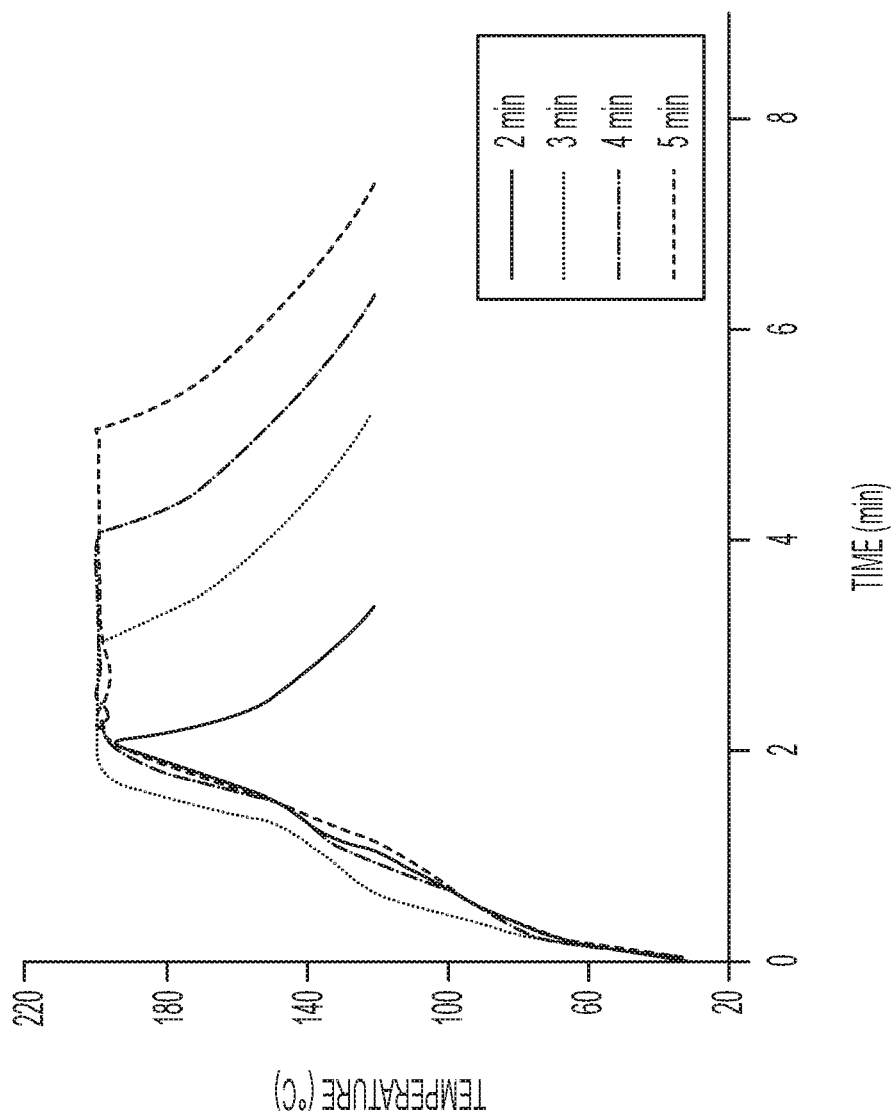
FIG. 5 is a graph illustrating temperature profile as a function of RF cure time as recorded by the FLIR camera.

Samples were prepared of a one-part automotive-grade epoxy system (Dow Betamate) loaded with 0.25 wt % CNTs, which is below the classical dc percolation threshold and yet still couples effectively with the RF power source. Lap shear samples were connected to an RF source and monitored with a FLIR camera so that power could be manually controlled to achieve a desired thermal cure profile. FIG. 5 is a graph illustrating temperature profile as a function of RF cure time as recorded by the FLIR camera. The samples all had an initial heating rate of approximately 5° C./s, similar to direct-contact hot-pressed films. The heating rate is determined by the applied RF power minus heat flux to the components being joined. The maximum heating rate is governed by the dielectric breakdown strength of the epoxy CNT composite, the degradation temperature of the epoxy, or other thermal considerations for the components to be joined. At higher loading levels (>0.5 wt %), dielectric breakdown and arcing events were observed if the power level (and thus the electric field) was raised too high. Using low CNT filler loading levels, an adhesive with higher dielectric breakdown strength or more sophisticated RF equipment may all help to mitigate breakdown events.

Figure 6:
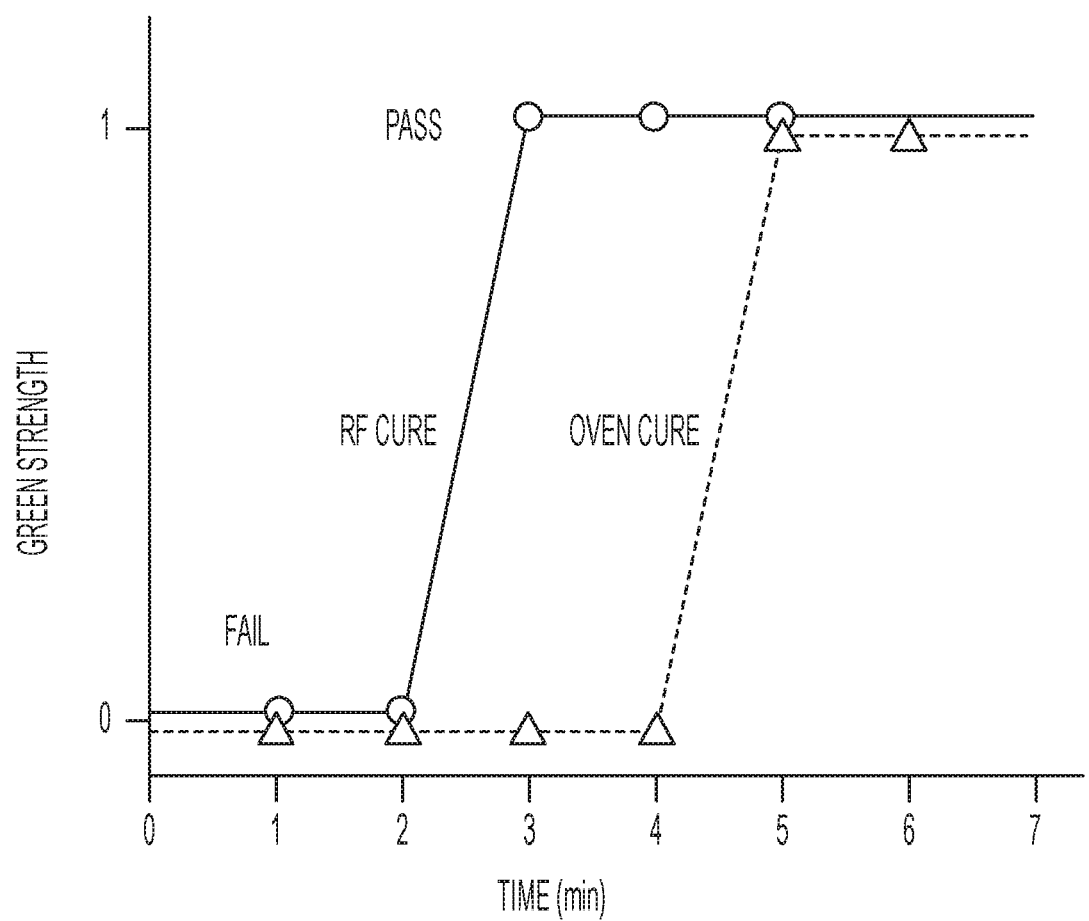
FIG. 6 is a graph illustrating time to reach equivalent green strength for traditional oven cure and RF curing technique.

The instant RF curing method allowed the adhesive sample to be brought up to the desired cure temperature of 200° C. within two minutes by applying up to 100 W of RF power at 44 MHz. After three minutes of heating, the RF-cured sample passed a green strength test, holding an 8.2 kg mass for a minimum of 30 seconds. The sample continued to hold the weight for 30 minutes before the grips were removed. The remaining RF lap shear samples that were cured for four and five minutes each passed the green strength test. FIG. 6 is a graph of time to reach equivalent green strength for traditional oven cure and RF curing technique. In contrast, the control samples (cured via convective heat transfer in an oven set to 200° C.) took five minutes to cure to green strength. After four minutes, the lap shear sample had begun to cure; however, the sample slipped via adhesive failure after a few seconds of the grips and weight being applied.

This difference between the RF curing and oven curing process is best explained by the heat-transfer mechanisms at work. In the RF curing technique, heat is generated volumetrically within the adhesive system itself via capacitively coupled Joule heating of the subpercolated CNT network. In the oven curing technique, the limiting factor is the convective heat transfer to the aluminum strips and the conduction heating into the epoxy. Epoxies, as well as most adhesive systems, are poor thermal conductors and share the same rate-limiting steps governed by Fourier's law. Volumetric RF curing of nanocomposite epoxies offers excellent opportunities for rapid curing of adhesive joints, especially in the automotive manufacturing sector where cycle times dictate which technologies are production-ready. Furthermore, volumetric curing would allow for a spatially uniform cure state over large samples.

Figure 1E:
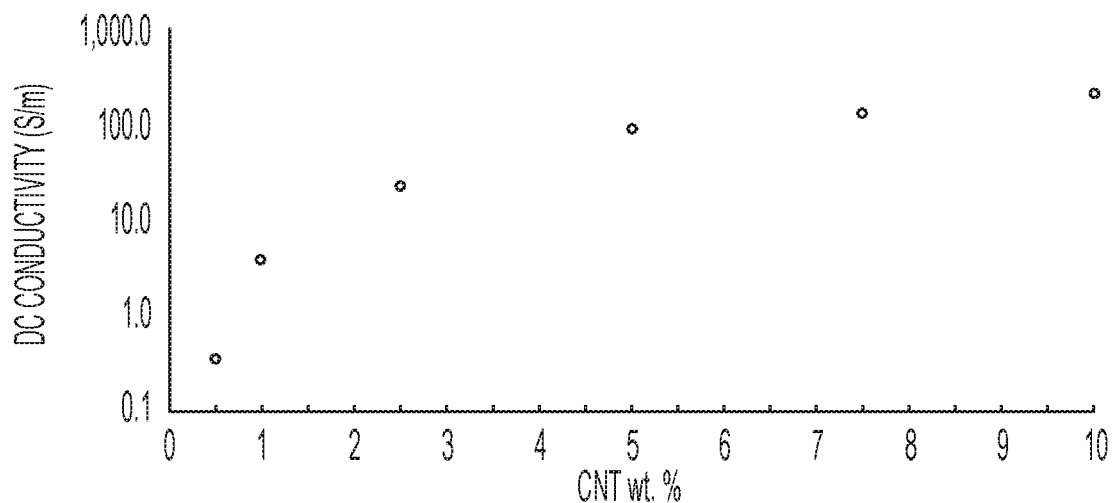
FIG. 1E is a graph of DC conductivity values as a function of CNT loading.
Figure 1F:
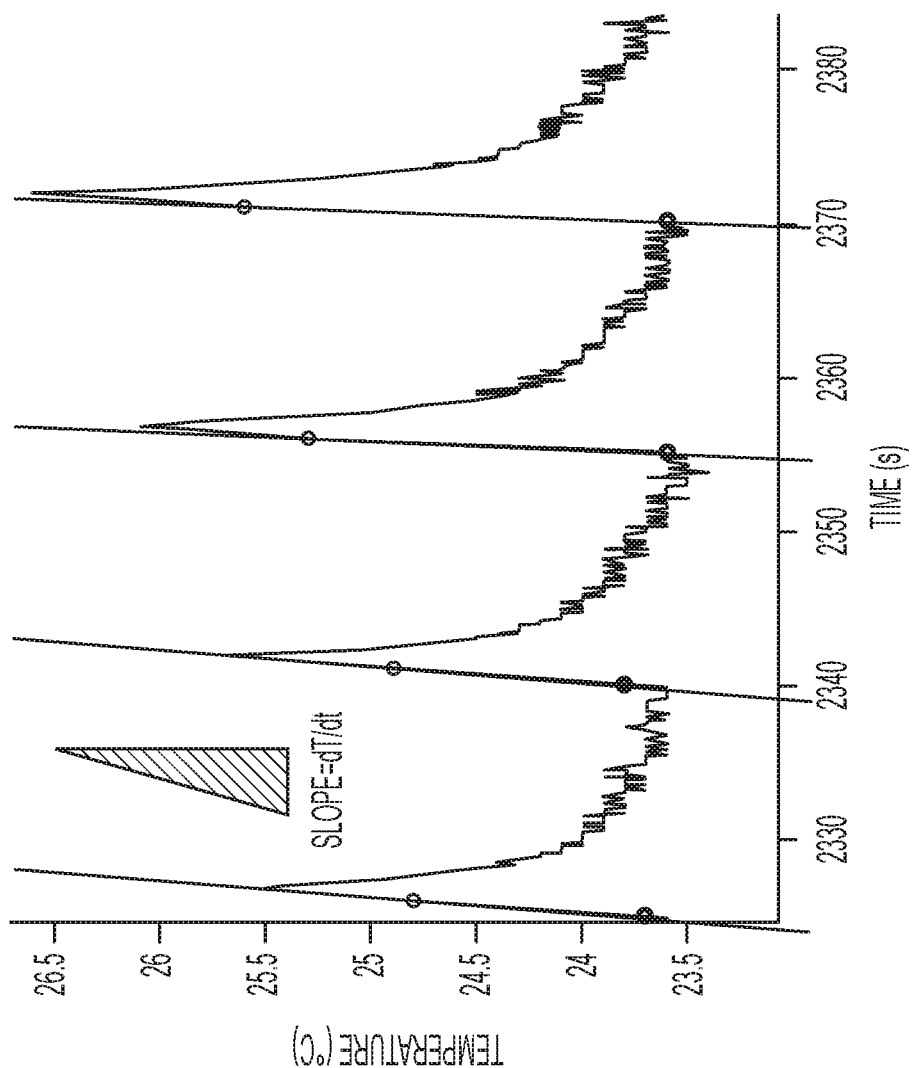
FIG. 1F is a graph of thermographic spectroscopy data for 0.1 wt % hot pressed film sample showing how the heating rate was calculated.
Figure 7:
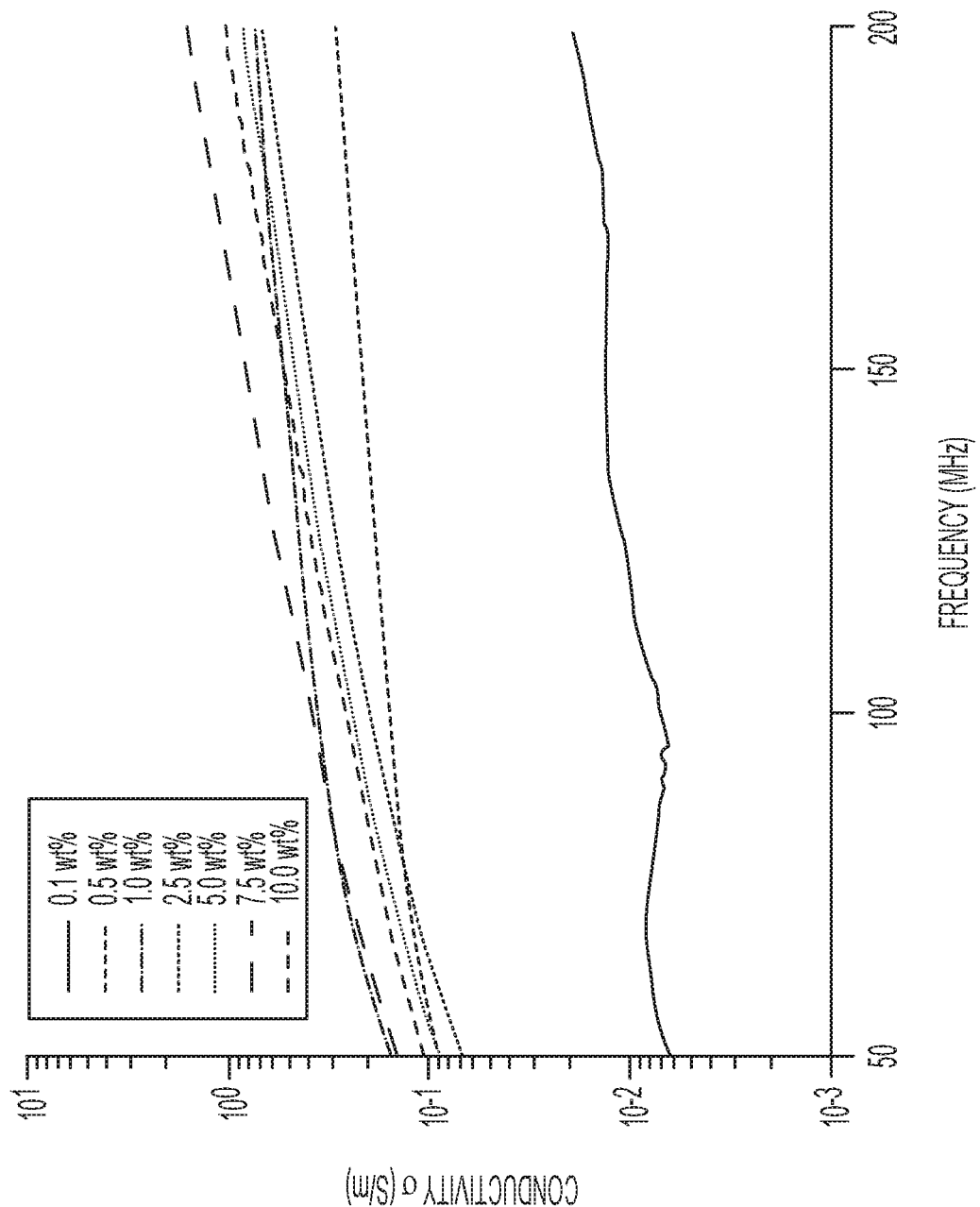
FIG. 7 is a graph illustrating dielectric spectroscopy results of AC conductivity versus frequency for various weight percentages of CNT/PLA composite films.
Figure 8:
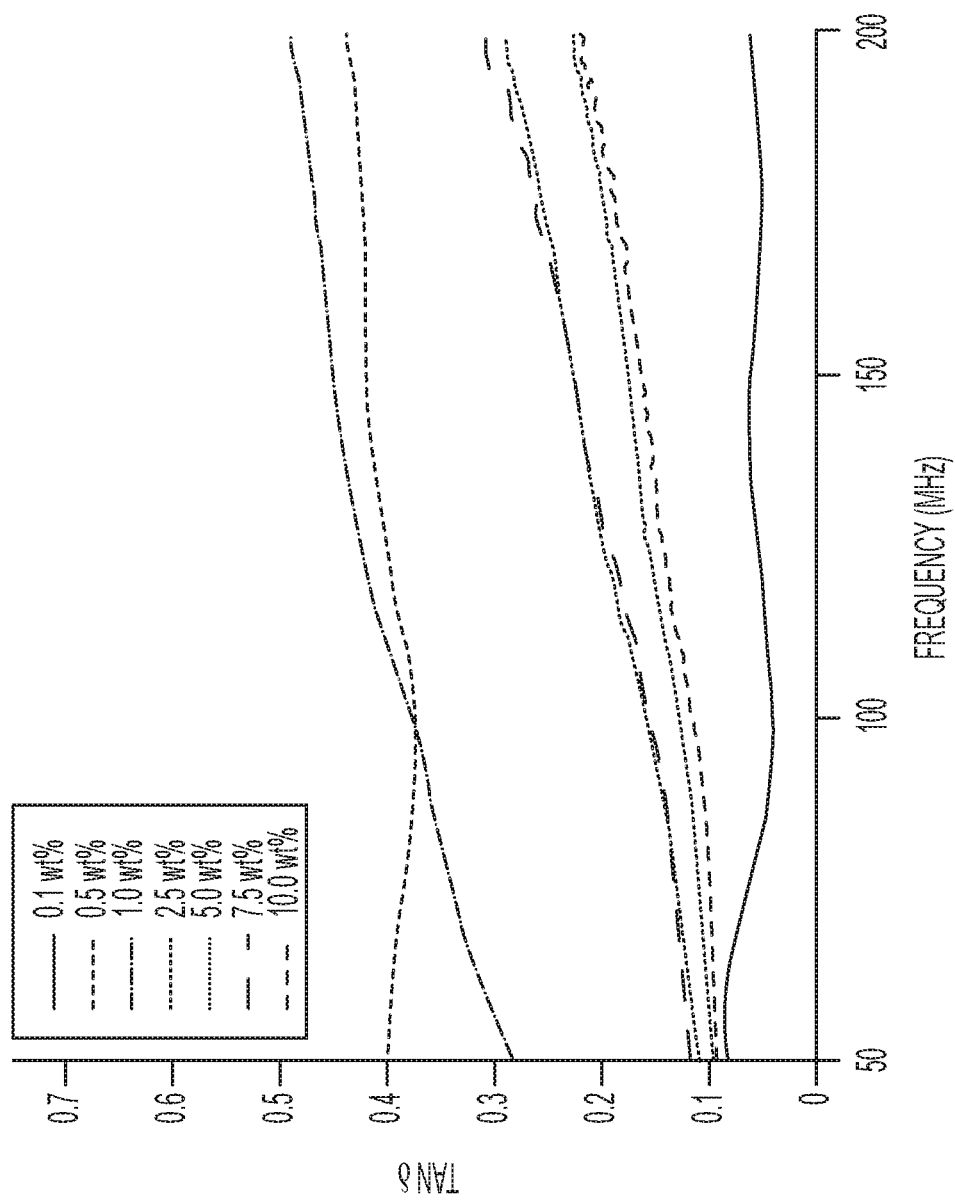
FIG. 8 is a graph illustrating dielectric spectroscopy results of loss tangent versus frequency for various weight percentages of CNT/PLA composite films.

Besides using less active filler material, the low loading levels of CNTs ensure that the adhesive maintains its inherent mechanical properties and is not significantly embrittled. This is also advantageous from a cost perspective by limiting the amount of nanomaterial filler necessary to achieve sufficient heating performance. Additional advantages for industrial applications include a large reduction in capital equipment costs typically associated with large ovens, custom tooling, and other heating elements. This heating method is highly efficient from an energy perspective because heat is generated directly within the target material; similar to induction heating, excessive heat losses are thus minimized Results Electrical Characterization To fully understand the RF heating response of the polymer CNT composite materials, hot-pressed PLA films were first characterized in the RF region using dielectric spectroscopy. The dielectric properties were plotted as a function of frequency from 50 to 200 MHz (See FIGS. 7-8), along with the DC conductivity values measured using four-point-probe (FIG. 1E). A large increase in conductivity was observed from 0.1 to 0.5 wt % in both AC and DC data, indicating the onset of a percolated network. Note that the apparent AC conductivity at low loading levels is generally higher than DC conductivity. This is because of contributions from capacitive coupling of isolated CNTs, in contrast to DC percolation behavior where CNTs must be close enough to enable electron hopping or tunneling from CNT to CNT. Note that nanomaterials other than CNTs may respond to RF fields, including graphene and carbon black, but the heating rates are lower. Prior reports have also established that the impurities that often accompany CNTs are not the primary source of heating.

Thermographic Spectroscopy

The PLA/CNT composite films (0.5 mm thick) were heated with RF power from 1 to 200 MHz and the heating rate was measured as a function of frequency. All samples from 0.1 to 10 wt % efficiently coupled and heated in response to the applied RF energy. This result is surprising when compared with microwave heating of similar CNT composite films. It has been shown that samples below 1 wt % heat very little in response to microwave energy, and samples above 5 wt % begin to reflect incident microwave energy and thus heat less. The 5 wt % composite film achieved the highest heating rate of 16° C./s. All samples displayed heating rates that are highly dependent on frequency with notable resonant modes. Resonant modes common to at least two samples are centered at approximately 5, 35, 90, 120, and 180 MHz. As a general trend, the lower weight percent composite samples coupled well at higher frequencies, and conversely, the higher weight percent composites coupled well at lower frequencies. This behavior is attributed to the fact that efficient coupling occurs at frequencies where the impedance seen by the RF source (due to the sample, applicator, and connecting cables) and the impedance of the RF source are closely matched (complex conjugate of each other). Samples with lower CNT loadings have lower dielectric constants and therefore result in a lower capacitance for the RF applicator compared with samples with high CNT loadings because the capacitance is proportional to the dielectric constant. Lower capacitance means higher impedance because the impedance of a capacitor is inversely proportional to the capacitance. Consequently, the frequency at which efficient coupling occurs needs to be higher to lower the impedance to bring it closer to the source impedance. Furthermore, the resonant frequency of a resonant circuit is inversely proportional to the capacitance, lower capacitance (lower CNT loadings) results in a higher resonance frequency.

The two main factors that contribute to the observed resonant modes are the impedance of the composite films and the characteristics of RF amplifier circuit. The CNT composite samples follow classic percolation models and exhibit complex capacitive impedance, especially at lower loading levels. On the basis of the heating rate results in FIG. 1C, there exists a clear distinction between the film heating behavior above and below 2.5 wt %, with the 2.5 wt % sample exhibiting crossover behavior between the two responses. This bimodal response tracked well with the DC percolation threshold. The higher loading films have a higher density of resistive interconnects between CNTs dispersed in the matrix and behave more like an ideal resistor without a reactive component. The films with lower CNT loading are composed of a predominantly disjointed network of CNTs. Such a network may be represented by a combination of resistors and capacitors in series and parallel (e.g., see FIG. 1C insert). The greater the contribution from capacitive effects, the more sensitive the heating rate will be to the resonant frequency of the power supply and overall circuit. Note also that the precise locations of these peaks will vary based on CNT dispersion quality, which would alter the capacitive contributions. Note also that the addition of functional groups to the CNTs would improve dispersion quality but may also affect CNT-CNT contact resistance.

RF Circuit Tuning and Matching

Perhaps the most important consideration for effectively heating nanocomposite materials with RF energy is the concept of impedance matching. Nanocomposite materials pose a unique challenge for matching, largely because their electrical properties can change over many orders of magnitude with small changes in composition or processing conditions. Additionally, nanocomposites are complex materials with both resistance and capacitance (the inductive component is negligible for nonmagnetic nanocomposites). Maximum power is transferred from the RF source to the load when the equivalent load impedance $Z_L$ (seen at the amplifier's output port) is equal to the complex conjugate of the RF source impedance $Z_S^*$, from the Thévenin equivalent circuit.

$$Z_L = Z_S^* \quad \text{Equation (1)}$$

This implies that the real part of the impedances (the resistance R) must equal each other and the imaginary part of the impedances (the reactance X) must cancel $$Z = R + iX \quad \text{Equation (2)}$$

$$R_S = R_L \quad \text{Equation (3)}$$

$$X_S = -X_L \quad \text{Equation (4)}$$

where RS is the source resistance, $R_L$ is the load resistance, $X_S$ is the source reactance, and XL is the load reactance. It is important to note that the load impedance includes both sample impedance and the impedance of the cables and other circuit elements used to connect the sample to the load; it is thus a lumped equivalent circuit. The complex impedance of the load ZL may be defined as $$Z_L = R_L + iX_L = R_L + i\left(\omega L_L - \frac{1}{\omega C_L}\right) \quad \text{Equation (5)}$$

where $L_L$ is the inductance of the load, CL is the capacitance of the load, and ω is the angular frequency given by ω=2 πf. When the inductive and capacitive reactances are equal, the system is said to be at resonance. The resonance frequency $\omega_r$ of a series RLC circuit is given by $$\omega_r = 1/\sqrt{LC} \quad \text{Equation (6)}$$

The RF source generally has a fixed resistance and zero reactance, and most commercial systems are designed to have an impedance of 50Ω. For our samples, the impedance is highly dependent on frequency, so these terms may be balanced to allow for efficient coupling by using frequency variation (as measured by heating rate in FIG. 1C). This could be used to employ RF-based curing of CNT/epoxy systems at low loadings, where samples with subpercolation loadings may still strongly couple to fields with the appropriately matched resonant frequency.

In contrast, most industrial RF heating systems employ an operating frequency within one of the defined industrial, scientific, and medicine bands designated for commercial use by the International Telecommunication Union (ITU) Radio Regulations (RR). Of the available bands, 13.56, 27.12, and 40.68 MHz are commonly used for heating. In these cases, efficient heating could be accomplished through impedance matching, which is typically carried out with a matching network composed of variable inductor and capacitor elements either manually or automatically controlled.

The instant system can be tailored based on composition of the nanocomposite rather than through the use of a matching network alone. This is also important because even matched systems that are as efficient as possible may be unable to heat a target material with low dielectric or resistive loss, that is, an epoxy system that would normally require very high power levels to heat could be made to heat at much lower power levels with the addition of a nanocomposite filler.

Applicator Techniques

Figure 2A:
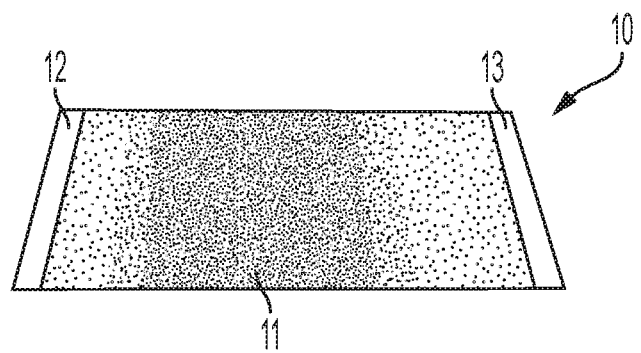
FIG. 2A illustrates a direct contact geometry for heating a thermoset adhesive.

Demonstrations of both direct contact and non-contact RF heating were carried out on the composite films. The direct contact method is the same as that used for the thermographic spectroscopy technique. FIG. 2A illustrates an exemplary direct contact film arrangement 10. Direct contact film arrangement 10 includes a film 11, a first electrode 12, and a second electrode 13. Film 11 is a thermoset adhesive with resistive heating capability. For example, film 11 may be a MWCNT/PLA film. Electrodes 12, 13 are painted onto film 11. As illustrated in FIG. 2A, electrodes 12, 13 are positioned on opposite ends of film 11. In some embodiments, electrodes 12, 13 comprise silver and are painted on ends or edges of film 11. One of electrodes 12, 13 is connected to the output of an RF amplifier and the other of electrodes 12, 13 is grounded. The RF amplifier supplies an RF signal (e.g., a sinusoidal RF signal) that creates and electric field between electrodes 12, 13 in the vicinity of film 11. The electric field interacts with the CNT within film 11 and creates resistive heating within film 11 to directly heat the adhesive. The gradient in film 11 illustrates an intensity of the electric field.

Figure 2B:
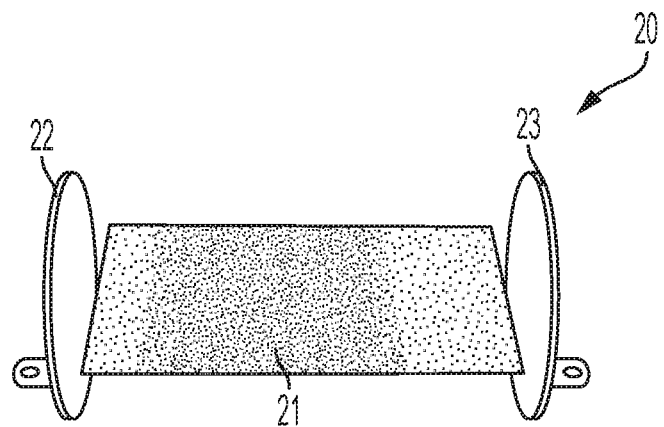
FIG. 2B illustrates a non-contact parallel-plate style capacitor applicator geometry for heating a thermoset adhesive.
Figure 2C:
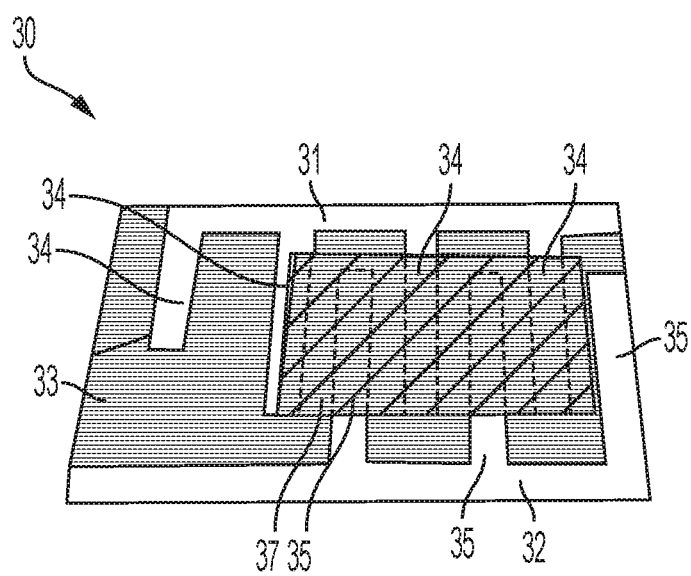
FIG. 2C illustrates a non-contact interdigitated capacitor style applicator geometry for heating a thermoset adhesive.

Referring now to FIGS. 2B and 2C, non-contact methods are illustrated. FIG. 2B illustrates an exemplary non-contact film arrangement 20. Exemplary non-contact film arrangement 20 includes a film 21 that is positioned between a first plate 22 and a second plate 23. Film 21 is a thermoset adhesive with resistive heating capability. For example, film 21 may be a MWCNT/PLA film. Plates 22, 23 are used as electrodes (similar to electrodes 12, 13 but spaced apart from film 21) and are generally parallel to one another to form a parallel plate capacitor. In the exemplary embodiment of FIG. 2B, plates 22, 23 are copper discs that are approximately 5 cm in diameter. Each plate 22, 23 is fixed to an insulating support bar. Film 21 is placed in-between plates 22, 23 without physically touching either plate. In some embodiments, plate 22 is positioned to contact a first part of two parts to be joined together and plate 23 is positioned to contact the other of the two parts to be joined. Each of the first and second parts to be joined together are conductive and allow an electric field to be established between plates 22, 23. The gradient in film 21 illustrates an intensity of the electric field. One of plates 22, 23 is connected to the center pin of the coaxial cable from the RF power source and the other of plates 22, 23 is grounded. The RF amplifier supplies an RF signal (e.g., a sinusoidal RF signal) to plates 22, 23. The electric field produced between plates 22, 23 induces a time-varying electric field in film 21, resulting in resistive heating. This heat is used to set the thermoset adhesive of film 21 and join the two parts together.

FIG. 2C illustrates an interdigitated capacitor arrangement 30. Exemplary interdigitated capacitor arrangement 30 includes a first electrode 31 and a second electrode 32. First and second electrodes 31, 32 are placed upon a substrate 33. In some embodiments, first and second electrodes 31, 32 are made from a copper tape. In other embodiments, first and second electrodes 31, 32 can be made from other conductive materials. First and second electrodes 31, 32 are laid down on substrate 33 to create a pattern of interdigitated "fingers" as illustrated in FIG. 2C. First electrode 31 includes fingers 34 and second electrode 32 incudes fingers 35. Substrate 33 may be, for example, a polyethermide or Ultem™ sheet. Other substrates can be used if desired. In some embodiments, first and second electrodes 31, 32 may be covered with an insulating layer 36, such as a layer of Kapton tape. The insulating layer helps prevent a short-circuit between first and second electrodes. 31, 32.

Figure 2D:
FIG. 2D is a side view of the non-contact interdigitated capacitor style applicator

One electrode 31, 32 is connected to a ground and the other of electrodes 31, 32 is connected to an RF amplifier (e.g., the center pin of a Type N bulkhead connector of the RF amplifier). For example, wires can be connected to first and second electrodes 31, 32 by clips, soldering, and the like. The RF amplifier supplies an RF signal (e.g., a sinusoidal RF signal) to electrodes 31, 32. An electric field produced between electrodes 31, 32 is utilized to induce a time-varying electric field in a film 37 positioned parallel to and spaced apart from electrodes 31, 32 (e.g., see film 37 in FIG. 2D). As illustrated in FIG. 2C, film 37 is smaller than interdigitated capacitor arrangement 30. In other embodiments, film 37 can be any of a variety of sizes. Film 37 is a thermoset adhesive with resistive heating capability. For example, film 37 may be a MWCNT/PLA film. In some embodiments, film 37 is spaced apart from electrodes 31, 32 by approximately 5 mm. The RF signal supplied to electrodes 31, 32 forms an electric field in the vicinity of film 37 that induces a time-varying electric field in film 37, resulting in resistive heating. This heat is used to set the thermoset adhesive of film 37. FIG. 2D is a side view of interdigitated capacitor arrangement 30 positioned in proximity to film 37. In some embodiments, film 37 is spaced apart from and does not contact interdigitated capacitor arrangement 30. In some embodiments, film 37 can contact insulating layer 36.

Interdigitated capacitor arrangement 30 is specifically useful for heating planar materials moving in reference to each other (either the material moves relative to the fringing field applicator or vice versa). The act of scanning the fringing field parallel to the field lines serves to uniformly heat the sheet or film. This configuration may find uses in heat-treating nanocomposite thin films, thermographically characterizing the electrical properties of printed electronics, and processing continuous feeds of materials.

Figure 3:
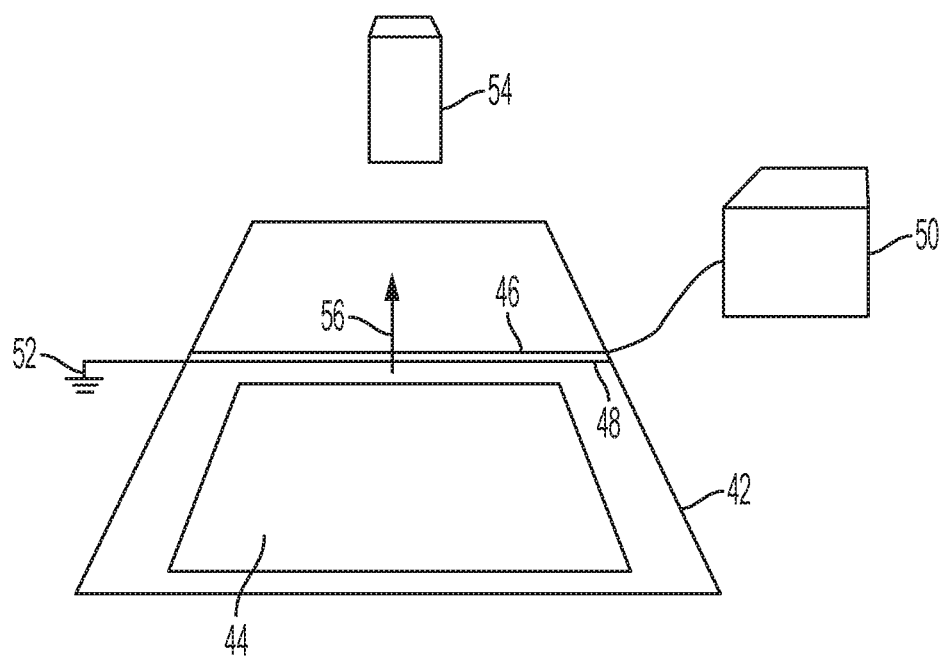
FIG. 3 illustrates a scanning system for application of RF heating to an adhesive.

FIG. 3 illustrates an example of a scanning system 40 for heating an adhesive. Scanning system 40 includes platform 42 across which a film 44 can be scanned or fed. Film 44 can be, for example, a MWCNT/PLA film or some other film that includes a susceptor. Film 44 can be sandwiched between two components to be joined. A first electrode 46 and a second electrode 48 span a width of platform 42 and are positioned so that film 44 can pass over electrodes 46, 48. As illustrated in FIG. 3, electrodes 46, 48 are straight electrodes that extend across platform 42. In other embodiments, electrodes 46, 48 can be implemented in other configurations. For example, electrodes 46, 48 could be implemented with an interdigitated capacitor design similar to interdigitated capacitor arrangement 30 of FIG. 2C.

First electrode 46 is connected to an output of an RF amplifier 50 and second electrode 48 is connected to a ground 52. When RF amplifier 50 outputs a signal, an electric field is created between and around electrodes 46, 48. In order to cure a thermoset adhesive of film 44, film 44 can be moved past electrodes 46, 48. The electric field interacts with the susceptors within film 44 and creates resistive heating within the thermoset adhesive of film 44. Arrow 56 illustrates a direction of travel of film 44 across platform 42. In other embodiments, film 44 can be articulated to move in any direction desired to ensure that film 44 is sufficiently exposed to the electric filed to cure the adhesive in film 44. In some embodiments, film 44 can be fed manually by hand across platform 42. In some embodiments, platform 42 includes a mechanism to convey film 44 across platform 42. Mechanism can include conveyor belts and the like.

In some embodiments, scanning system 40 can include an infrared camera 54. Infrared camera 54 is positioned to monitor film 44 as it is processed by scanning system 40. Infrared camera 54 can provide temperature data regarding film 44 to provide an indication regarding curing of the thermoset adhesive within film 44.

In other embodiments, electrodes 46, 48 can be plates of a parallel capacitor, one of which is placed above a plane of platform 42 and the other of which is placed below the plane of platform 42. In such embodiments, film 44 (and the components to be joined) can be passed through the space between electrodes 46, 48. Upon application of an RF signal to the parallel pate capacitor, film 44 is heated as it passes therethrough via resistive heating.

Both non-contact methods are operated in an "electrically small" configuration; that is the dimensions of the applicator are less than one-eighth the wavelength of the applied RF field (at 200 MHz the wavelength is approximately 1.5 m). Because of this, the electric fields generated between the plates or interdigitated fingers cannot establish standing waves, and so are highly uniform in nature.

In each of the examples discussed above, the samples heated rapidly in response to the applied electric field with heating rates over 100° C./s observed in response to power levels of a few hundred watts. The direct-contact configuration generated heat in a 1.0 wt % CNT PLA film at 315 Watts applied power at 100 MHz after four seconds of applied power. This is the simplest RF field application method and was generally the least sensitive to factors such as film orientation in the electric field. The noncontact heating results are similarly energetic. The non-contact plate arrangement of FIG. 2B would be very useful for targeted heating of a material that is embedded or otherwise inaccessible to direct contact with metallic electrodes. Another useful application could be the efficient and direct heating of a nanocomposite material in a tube furnace where indirect heating via an oven is typically implemented.

Figure 9:
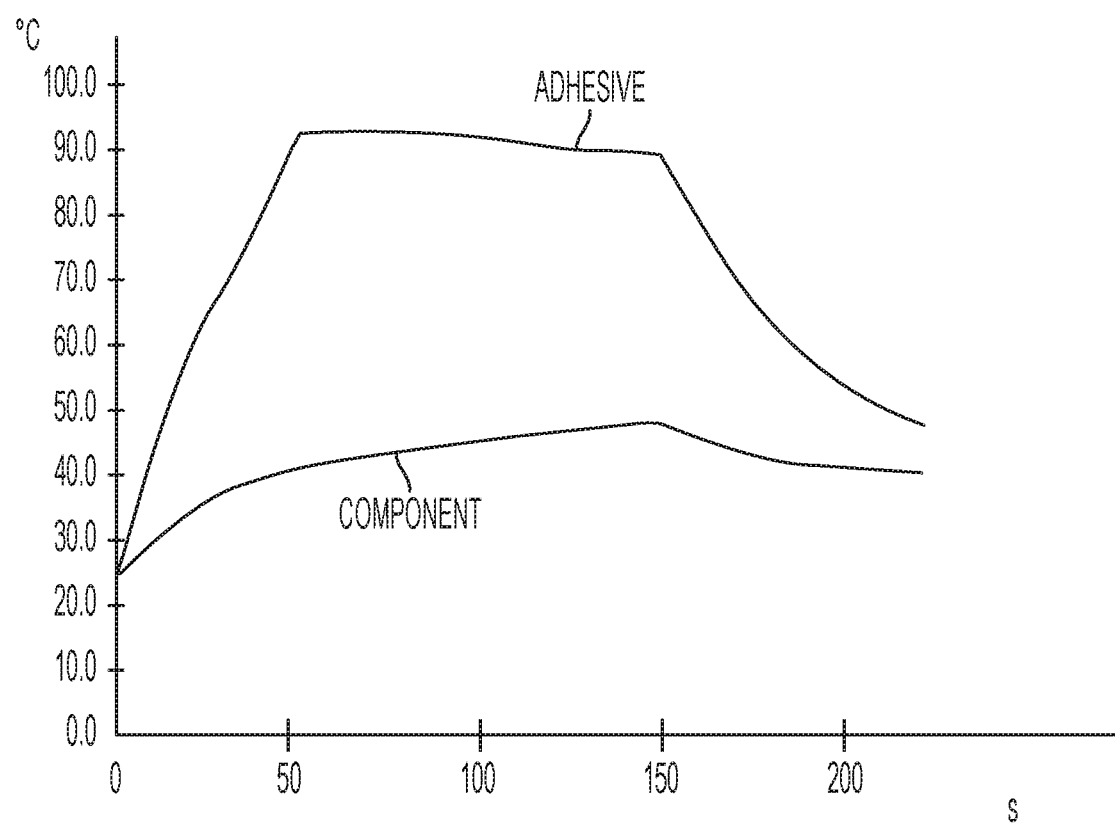
FIG. 9 is a graph illustrating temperature versus time of a thermoset adhesive and two components being joined.

Referring now to FIG. 9, a graph illustrating temperature versus time of a thermoset adhesive and two components being joined together is shown. FIG. 9 is representative of the temperature change in a thermoset adhesive of the instant application and the components being joined together in the presence of an electric field. In practice, the temperature responses of a particular thermoset adhesive and particular components being joined together depends upon various factors, such as the type of adhesive, the type and amount of susceptors, the characteristics of the RF signal, the material characteristics of the components being joined, and the like. At time t=0, the RF heating process begins with application of an RF signal to create an electric field in proximity to thermoset adhesive. At t=0, the temperatures of the parts to be joined and the thermoset adhesive are the same at approximately 25° C. In the presence of an electric field, the temperature of the thermoset adhesive climbs relatively quickly compared to the temperature of the components. After approximately 50 seconds, the thermoset adhesive has reached a temperature of over 90° C. In contrast to the thermoset adhesive, the temperature of the components has only risen to approximately 40° C. The rise in temperature of the components is not a direct result of the electric field, but rather is a result of the conduction of heat from the heated thermoset adhesive. Continued application of the electric field maintains the temperature of the thermoset adhesive. The temperature of the components continues to slowly rise, but maintains a temperature that is dramatically lower than the temperature of the thermoset adhesive. At approximately 150 seconds, the RF signal, and the corresponding electric field, is stopped. Without the electric field, the temperature of the thermoset adhesive begins to drop and will eventually reach equilibrium with the surroundings. The temperature of the components likewise drops and will also reach equilibrium with the surroundings. FIG. 9 illustrates that the instant RF method of heating results in much lower temperatures in the components being joined. The reduction in temperature eliminates or reduces distortion, warping, and/or coefficient of thermal expansion mismatch in the components that are being joined together.

COMSOL Modeling

The applicator configurations discussed above were modeled in COMSOL, a simulation program, to develop a fuller understanding of the electric field distribution in the samples and the coupled heat generated by the RF energy. Modeling the applicator geometry and sample to be heated can be a valuable tool for creating an efficient and effective RF heating module in a real-world application.

Figures 4A, 4B, 4C:
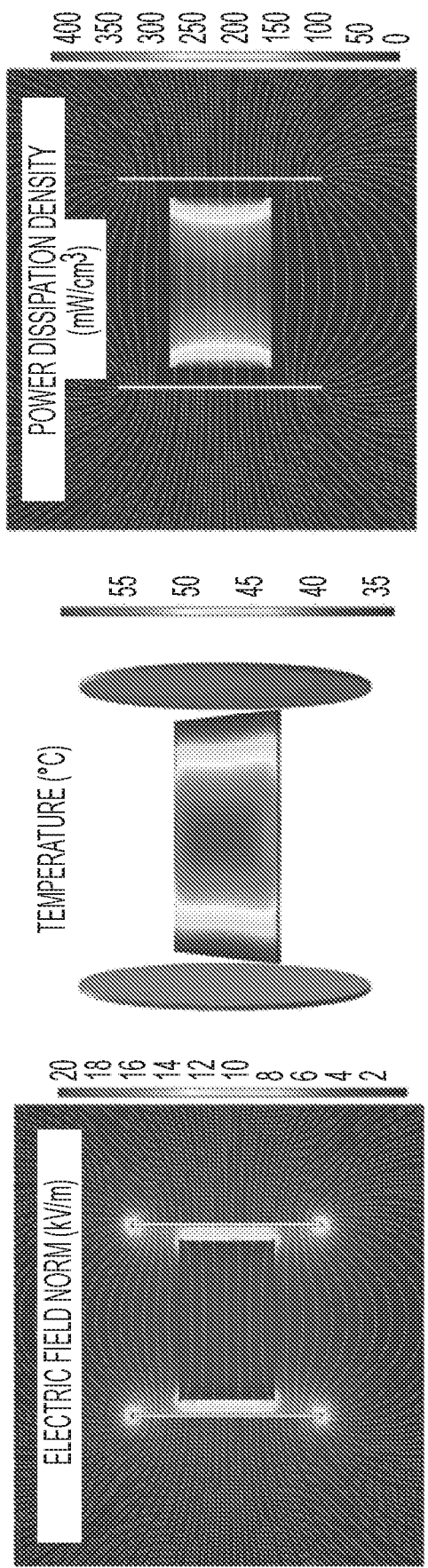
FIG. 4A is a COMSOL model of electric field strength about a sample between plates of a capacitor.
FIG. 4B is a COMSOL model of a steady-state temperature field generated in the sample of FIG. 4A.
FIG. 4C is a COMSOL model of power dissipation density of the sample of FIG. 4A.

For this geometry, an electric field was modeled with a lumped port and a power input of 100 W was used. For a 50Ω system, this results in a peak voltage input of 100 V. The dielectric properties of the film were taken from the measurements performed earlier. Using COMSOL Multiphysics RF and Heat-Transfer modules, the electric field distribution in the film was calculated and coupled with the material dielectric properties to determine the power dissipation and thus the temperature increase in the material. FIGS. 4A-4C illustrate the electric field distribution, the temperature rise, and power dissipation density, respectively, for a capacitively coupled parallel plate applicator. Calculating the maximum predicted electric field strength is important to ensure that the system is operated well below the dielectric breakdown voltage of air (approximately 3 MV/m) and the breakdown strength of the composite materials to be heated. Outside the sample, the maximum electric field concentrates around sharp edges of the applicator plates and corners of the sample. Note that the strong electric field intensity shown in FIG. 4A is in the air gap region between the plates and the sample. This is due to the fact that for the parallel plate configuration considered in this simulation, the electric field is almost perpendicular to the interface between the air region and the sample. Boundary conditions for the electromagnetic fields dictate that the normal component of the electric flux density must be continuous across the interface between the air region and the dielectric region (the sample). The electric flux intensity $\vec{E}$ is related to the electric flux density through the relation $\vec{E} = \vec{D}/\epsilon$ where $\epsilon$ is the material's permittivity. For and ideal parallel plate configuration, $\vec{D}$ is the same in both regions; consequently, the electric field intensity $\vec{E}$ in the air gap region is stronger than in the dielectric sample because the permittivity of the dielectric is higher than that of air. Within the dielectric sample, more heating occurs in the sample's center, as illustrated by the gradient in FIG. 4B, which is consistent with power dissipation in FIG. 4C. Heating is due to induced currents in the sample; power dissipated in the sample (as heat) is proportional to the induced currents. The current distribution within the sample is at a maximum at the sample's center and gradually drops toward the edges near the plates. However, the electric field and the heating across various samples is more uniform than the results we previously showed for microwave waveguide heating of composite films where heating uniformity was highly dependent on the dielectric properties of the film.

APPLICATION

Automotive and aerospace industry focused applications of this technology include bonding aluminum sheets with a high performance epoxy adhesive loaded with carbon nanotubes. It is highly desirable to bond aluminum and composite parts with high-performance adhesives instead of rivets or traditional welds. Properly selected adhesives outperform both welds and mechanical fasteners in regard to mechanical strength, impact, and fatigue resistance as well as weight. Historically, the one-part epoxies used to bond vehicle components required cure temperatures of 180° C. for 30 minutes to reach full strength. This required the components to be placed in large expensive ovens, draped with heater blankets, hot air guns, or infrared heaters to achieve the desired degree of cure. With the instant RF curing technique, the epoxy adhesive itself volumetrically generates the required heat for curing because of Joule heating of the embedded CNTs. The nanotube loading level is below the classical DC percolation threshold, yet still couples effectively with the RF power source. Besides using less active filler material, the low loading levels of CNTs ensure the adhesive is not significantly embrittled.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of joining two components via direct heating of a thermoset adhesive, the method comprising:
    applying the thermoset adhesive to at least a first component of the two components, the thermoset adhesive comprising a susceptor;
    painting a first electrode on one end of the thermoset adhesive;
    painting a second electrode on the opposite end of the thermoset adhesive from the first electrode;
    contacting the first component with the first electrode;
    contacting a second component of the two components with the second electrode;
    contacting the second component with the thermoset adhesive;
    creating an electromagnetic field by applying an RF signal across the first and second electrodes; and
    wherein the susceptor interacts with the electromagnetic field to heat the thermoset adhesive via resistive heating.

2. The method of claim 1, wherein the two components are not directly heated by the electromagnetic field.

3. The method of claim 1, wherein the thermoset adhesive further comprises an epoxy.

4. The method of claim 3, wherein the thermoset adhesive further comprises a urethane.

5. The method of claim 1, wherein the susceptor comprises carbon nanotubes.

6. The method of claim 5, wherein the carbon nanotubes comprise approximately 0.1 to 0.5 wt % of the thermoset adhesive.

7. The method of claim 5, wherein the carbon nanotubes comprise approximately 1.0 to 10.0 wt % of the thermoset adhesive.

8. The method of claim 1, wherein the susceptor comprises a graphene nanosheet.

9. The method of claim 1, wherein the susceptor comprises carbon black particles.

10. The method of claim 1, wherein the susceptor comprises inorganic nanomaterials.

11. The method of claim 1, wherein the first electrode is connected to an output of an RF amplifier and the second electrode is grounded.

12. The method of claim 11, wherein the applying the electromagnetic field comprises outputting, by the RF amplifier, an RF signal between approximately 3 kHz to approximately 300 MHz.

13. A structure manufactured by the process of claim 1, the structure comprising the first component, the second component, and the thermoset adhesive.

* * * * *